United States Patent
Agrawal et al.

(10) Patent No.: US 9,461,980 B1
(45) Date of Patent: Oct. 4, 2016

(54) PREDICTIVE PREFETCHING OF ATTRIBUTE INFORMATION

(71) Applicant: Juniper Networks, Inc., Sunnyvale, CA (US)

(72) Inventors: Ankur Agrawal, Bangalore (IN); Chandrasekaran Rajagopalan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 377 days.

(21) Appl. No.: 14/228,946

(22) Filed: Mar. 28, 2014

(51) Int. Cl.
*H04L 29/06* (2006.01)

(52) U.S. Cl.
CPC .................................. *H04L 63/08* (2013.01)

(58) Field of Classification Search
None
See application file for complete search history.

(56) References Cited

U.S. PATENT DOCUMENTS

| | | | | |
|---|---|---|---|---|
| 6,614,788 B1* | 9/2003 | Martin | ............... | H04L 29/12216 370/392 |
| 2003/0172145 A1* | 9/2003 | Nguyen | ................ | G06Q 10/10 709/223 |
| 2006/0143440 A1* | 6/2006 | Ponnapalli | ............... | H04L 63/08 713/155 |
| 2009/0165096 A1* | 6/2009 | Hughes | ............... | H04L 63/0892 726/5 |
| 2009/0290539 A1* | 11/2009 | Xia | .................... | H04L 29/12801 370/328 |
| 2009/0307753 A1* | 12/2009 | Dupont | ............... | H04L 12/2872 726/3 |
| 2011/0228734 A1* | 9/2011 | Laganier | ........... | H04L 29/12283 370/329 |
| 2012/0117622 A1* | 5/2012 | Gronholm | ............... | G06F 15/16 726/3 |
| 2014/0071967 A1* | 3/2014 | Velasco | ............... | H04L 12/1403 370/338 |
| 2014/0130130 A1* | 5/2014 | Hughes | ............... | H04L 63/0892 726/3 |
| 2015/0012967 A1* | 1/2015 | Nedbal | ................. | H04L 63/101 726/1 |
| 2015/0180871 A1* | 6/2015 | Shaik | .................... | H04L 67/306 726/7 |

OTHER PUBLICATIONS

Rigney et al. "Remote Authentication Dial in User Service (Radius)" Network Working Group, Request for Comments: 2865, Jun. 2000, 77 pgs.

* cited by examiner

*Primary Examiner* — Jeffery Williams
(74) *Attorney, Agent, or Firm* — Shumaker & Sieffert, P.A.

(57) ABSTRACT

In one example, a method includes predicting, by a network access control (NAC) device based on a device identifier in a request from a client device and a device usage history of the client device, a user associated with the client device, prior to completing a user authentication process, requesting, by the NAC device and from a directory server, session attributes for the predicted user, receiving, by the NAC device and from an authentication server, an indication of whether a user associated with the client device was successfully authenticated. The method includes determining, based on an identifier of the user, whether the predicted user is the user associated with the client device, and responsive to determining that the predicted user is the user associated with the client device, establishing, by the NAC and using the session attributes for the predicted user, a session between the client device and the network.

20 Claims, 4 Drawing Sheets

PREDICTIVE PREFETCHING OF ATTRIBUTE INFORMATION

TECHNICAL FIELD

This disclosure generally relates to computer networks, and more particularly, to authentication techniques for use in computer networks.

BACKGROUND

Administrators of enterprises and other organizations can implement network access control in order to control the ability of endpoint devices to access resources of a computer network. For example, an enterprise may implement a computer network that includes an email server. In order to prevent unauthorized users from communicating with this email server, the enterprise may implement a network access control system that prevents unauthorized users from sending network communications via the computer network unless the users provide a correct username and password.

To gain access to protected network resources, a client executing on an endpoint device may establish a network access session with a network access control server executing on a policy decision point (e.g., a network access control device). To establish the network access session, the client may issue a request to establish a network session to the network access control server and/or issue a request for one or more protected network resources on the network. The network access control server may authenticate the identity of a user based on one or more security credentials (e.g., a username/password combination) provided by the endpoint device, and grant access to authenticated devices that satisfy the security policy implemented by the network access control server. In some cases, the security policy may grant access to all authenticated users.

After an endpoint device has been authenticated (e.g., based on the supplied user credentials) and any other optional security policy criteria are fulfilled, the network access control server may establish a network access session with the user. For example, the network access control server may issue one or more policies to one or more enforcement devices that allow the authenticated user to access one or more sets of protected resources on the network.

In order to process the received credentials to determine whether to authenticate an endpoint device, the network access control server is configured to match the credentials against proven credentials stored at an authentication server. As an example, the network access control server is configured to receive user credentials from an endpoint device, and in response, to match the user credentials against trusted credentials stored at the authentication server. If the user credentials match against any of the trusted credentials, the network access control server grants the endpoint device access to the enterprise network. In turn, after completing authentication of the endpoint device, the network access control server fetches communication session attributes from an LDAP server, and configures the communication session with the endpoint device using the fetched attributes.

SUMMARY

This disclosure is generally directed to techniques for improving efficiency of user network access control processes. In various implementations, the techniques are directed to a "parallel" authentication system, which may reduce user login time in comparison to a serial process. For instance, a network access control (NAC) server may implement one or more techniques described herein to identify an endpoint device that is requesting network access, and prior to completion of user authentication can "pre-fetch" LDAP attributes for a user predicted to be requesting network access based on historical user data associated with the endpoint device. The NAC server may receive user credentials provided by the endpoint device for authentication. In parallel with pre-fetching the predicted user attributes from the LDAP server, the NAC server may authenticate the endpoint device with an authentication server, using the received user credentials.

In one example, a method includes receiving, by a network access control (NAC) device and from a client device, a request for access to a network, wherein the request includes a device identifier for the client device, predicting, by the NAC device and based on the device identifier and a device usage history of the client device, a user assumed to be making the request, prior to completing a user authentication process, requesting, by the NAC device and from a directory server, session attributes for the predicted user, receiving, by the NAC device and from an authentication server, an indication of whether a user associated with the client device was successfully authenticated, determining, by the NAC device and based on an identifier of the user, whether the predicted user is the user associated with the client device, and responsive to determining that the predicted user is the user associated with the client device, establishing, by the NAC and using the session attributes for the predicted user, a session between the client device and the network.

In another example, a network access control device includes one or more processors, one or more network interfaces that receive, from a client device, a request for access to a network, wherein the request includes a device identifier for the client device, a pre-fetch module operable by the one or more processors to predict, based on the device identifier and a device usage history of the client device, a user assumed to be making the request, prior to completing a user authentication process, request, from a directory server, session attributes for the predicted user, an authentication module operable by the one or more processors to receive, from an authentication server, an indication of whether a user associated with the client device was successfully authenticated and determine, based on an identifier of the user, whether the predicted user is the user associated with the client device, and a client device communication module operable by the one or more processors to, responsive to determining that the predicted user is the user associated with the client device, establish, using the session attributes for the predicted user, a session between the client device and the network.

In another example, a non-transitory computer-readable storage medium includes instructions for causing one or more programmable processors of a network access control (NAC) device to: receive, from a client device, a request for access to a network, wherein the request includes a device identifier for the client device, predict, based on the device identifier and a device usage history of the client device, a user assumed to be making the request, prior to completing a user authentication process, request, from a directory server, session attributes for the predicted user, receive, from an authentication server, an indication of whether a user associated with the client device was successfully authenticated, determine, based on an identifier of the user, whether the predicted user is the user associated with the client device, and responsive to determining that the predicted user is the user associated with the client device, establish, using the session attributes for the predicted user, a session between the client device and the network.

The techniques described herein may provide one or more potential advantages. As one example, by pre-fetching user attributes in parallel with performing user authentication, as described herein, the NAC server may reduce the time required to complete user login using serial implementations. This may provide a more efficient login and network access control approach which gives a user a potentially faster and more convenient login experience.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
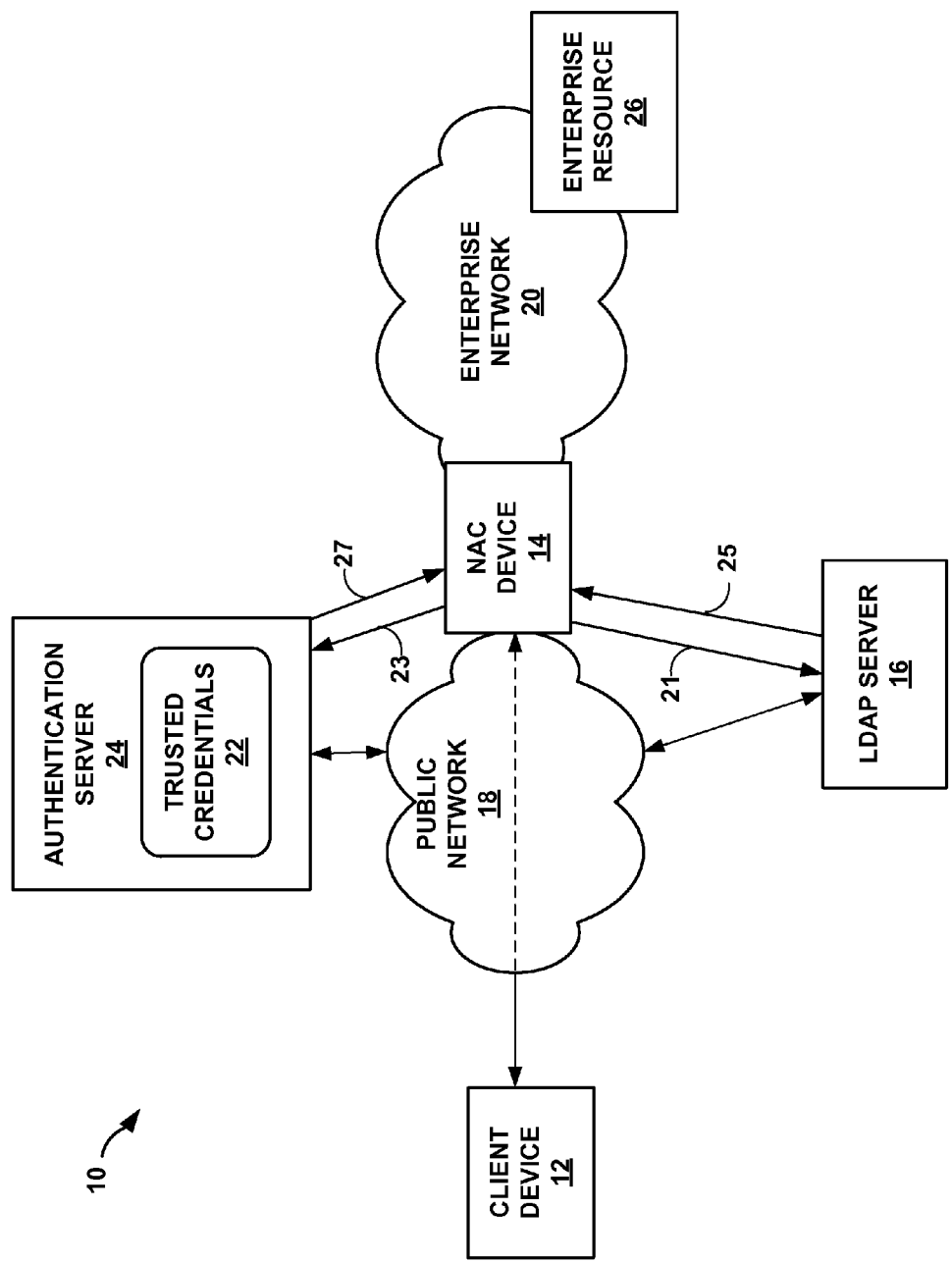
FIG. 1 is a conceptual diagram illustrating the topology of an example network environment in accordance with one or more aspects of this disclosure.

FIG. 1 is a is a conceptual diagram illustrating topology of an example network environment 10 in which a network access control (NAC) device 14 performs predictive pre-fetching of user attributes from a directory server such as an lightweight directory access protocol (LDAP) server 16 in accordance with one or more aspects of this disclosure. Network environment 10 includes a client device 12, a NAC device 14, an LDAP server 16, a public network 18, and an enterprise network 20. Authentication server 24 stores trusted credentials 22 used for authenticating one or more users of client devices such as client device 12.

In the example network environment 10 of FIG. 1, enterprise network 20 may be, for example, an enterprise network associated with an organization. Enterprise network 20 may be a public or private network that implements a network access control system to control access to one or more resources on enterprise network 20. In examples, the network access control system can control access to network resources, such as enterprise resource 26, on enterprise network 20 based on one or more security requirements for the network, which may include user identity authentication requirements, user role requirements, and/or endpoint device (e.g., client device) security requirements. Public network 18 may be an unsecure, publicly accessible network, e.g., the Internet. NAC device 14 provides authentication and establishment of network access for client device 12 such that client device 12 may begin exchanging data packets over enterprise network 20 via public network 18, which may be an internal or external packet-based network such as the Internet.

Public network 18 may provide, for example, bulk data delivery, voice over Internet protocol (VoIP), Internet Protocol television (IPTV), Short Messaging Service (SMS), Wireless Application Protocol (WAP) service, or customer-specific application services. Public network 18 may comprise, for instance, a local area network (LAN), a wide area network (WAN), the Internet, a virtual LAN (VLAN), an enterprise LAN, a layer 3 virtual private network (VPN), or some combination thereof. In various examples, public network 12 is connected to a public WAN, the Internet, or to other networks. Public network 18 executes one or more packet data protocols (PDPs), such as IP (IPv4 and/or IPv6), X.25 or Point-to-Point Protocol (PPP), to enable packet-based transport of public network 12 services.

In general, client device 12 may request authorization and access to enterprise resources by sending a session request to NAC device 14. In response to receiving the session request, NAC device 14 accesses authentication server 24 to authenticate the subscriber device requesting network access. In some examples, authentication server 24 may be an Authentication, Authorization and Accounting (AAA) server such as a Remote Authentication Dial In User Service (RADIUS) server that provides centralized Authentication, Authorization, and Accounting (AAA) management. The RADIUS protocol is described in Carl Rigney et al., "Remote Authentication Dial In User Server (RADIUS)," Network Working Group of the Internet Engineering Task Force (IETF), Request for Comments 2865, June 2000, which is incorporated by reference herein in its entirety (referred to hereinafter as "RFC 2865").

Client device 12 represents, in various examples, an enterprise, a residential subscriber, or a mobile subscriber. Client device 12 may include, be, or be part of, for example, personal computers, laptop computers or other types of computing devices. In addition, client device 12 may comprise mobile devices that access the enterprise network 20 and enterprise resources 26. Examples of client device 12 include mobile telephones (such as smartphones), laptop or desktop computers having, e.g., a 3G wireless card, wireless-capable netbooks, video game devices, pagers, smart phones, personal data assistants (PDAs) or the like. Client device 12 may run a variety of software applications, such as word processing and other office support software, web browsing software, software to support voice calls, video games, videoconferencing, and email, among others. Client device 12 can connect to public network 18 via communication links (not shown) that comprise wired and/or wireless communication links. The term "communication link," as used herein, comprises any form of transport medium, wired or wireless, and can include intermediate nodes such as network devices. Although a single client device 12 is shown for purposes of example, multiple different client devices 12 may access enterprise network 20 via public network 18.

Client device 12 communicates with NAC device 14 via public network 18. In turn, client device 12 may relay communications through NAC device 14 over enterprise network 20, contingent on NAC device 14 granting client device 12 access to enterprise network 20. Client device 12 is an example of an endpoint device that provides a user access to public network 18 and, via NAC device 14, to enterprise network 20. For example, client device 12 may be a communication device associated with an individual user or employee (e.g., an employee of the organization that manages and hosts enterprise network 20). For example, client device 12 may be a company-issued or company-approved personal computer, personal digital assistant (PDA), smart-phone, laptop computer, video-game console, application running thereon (e.g., a web browser), or other type of computing device or application that is capable of requesting access to and utilizing resources available from enterprise network 20.

Because enterprise resource 26 is situated in enterprise network 20, enterprise resource 26 is typically not available to the public over public network 18. Enterprise resource 26 may be for example, a web-based resource, such as a web application, a web document, a word processing file, an email application, a database server, a file server, browser setting, or the like. Registered users of enterprise network 20 may be required to provide authentication credentials to access enterprise resource 26 of enterprise network 20. Users may access the enterprise resource 26 of enterprise network 20 from local host devices within enterprise network 20 (e.g., from devices within the organization associated with enterprise network 20) and/or access such resources remotely from client devices, such as client device 12, via public network 18.

NAC device 14 provides NAC services to control access to protected resources on enterprise network 20 by users of enterprise network 20. In some examples, NAC device 14 may provide controlled access to resources within enterprise network 20 (e.g., enterprise resource 26) for client devices by establishing one or more network access sessions between remote client devices and enterprise network 20. Although NAC device 14 is illustrated as being positioned at the edge of enterprise network 20 (e.g., as an interface to/from enterprise network 20), in other examples, NAC device 14 may be inside of enterprise network 20 or external to enterprise network 20.

In order to access resources within enterprise network 20, a user may launch a NAC client on client device 12. The NAC client may communicate with NAC device 14 during the process of authenticating client device 12 with authentication server 24. The NAC client running on client device 12 may also negotiate security parameters needed to establish the network access session with NAC device 14. For example, the NAC client may receive user identity authentication credentials (e.g., a username/password), e.g., entered by a user via a user interface presented by client device 12. The NAC client of client device 12 may then provide the entered credentials to NAC device 14. In additional examples, the NAC client may exchange public keys with NAC device 14, generate pairs of security associations for use by client device 12 and NAC device 14, etc. In some examples, the NAC client may execute within a browser window. For example, a browser may present a user interface that requests security credentials from the user. In additional examples, the NAC client may be a stand-alone software module that executes separate from the browser. For example, the user may launch a stand-alone application that is separate from the browser and which requests security credentials from the user.

Enterprises may also use other strategies to implement network access control, such as inserting firewalls between client devices and server or other network resources. In order to access any protected resources available through enterprise network 20, client device 12 provides identity authentication information, such as user credentials, to NAC device 14. In turn, NAC device 14 can send a message 23 providing the user credentials to authentication server 24, which compares the user credentials (received from client device 12) to trusted credentials 22, to determine whether or not client device 12 should be authenticated. For instance, authentication server 24 accesses trusted credentials 22. If the user credentials match any set of credentials (e.g., username/password tuple) included in trusted credentials 22, then authentication server 24 indicates to NAC device 14, via authentication message 27, that the user is authenticated, and in response NAC device 14 grants client device 12 access to enterprise network 20 and provisions access for client device 12 to enterprise network 20. As described below, NAC device 14 can also send message 21 requesting user attributes from LDAP server 16 for a predicted user in parallel with performing the user authentication steps. An example of message 21 is an LDAP BIND request.

Although explained above with respect to NAC device 14, authentication processes described herein also apply to secure shell login (SSL) and virtual private network (VPN) server devices, and one or more other devices configured to perform authentication and/or authorization functionalities, and to fetch user attributes from an LDAP backend server. Upon authenticating client device 12 and provisioning the communication session via enterprise network 20, NAC device 14 fetches or retrieves various attributes of the communication session from LDAP server 16. For instance, NAC device 14 sends attribute request message 21 (e.g., an LDAP BIND request) to LDAP server 16, and receives attribute response message 25 in response. More specifically, the fetched attributes are associated with various parameters and/or characteristics of the communication session provisioned by NAC device 14 for client device 12. For instance, the attributes may include a default home page to which to route a browser, based on preferences associated with the user credentials provided by client device 12.

Often, the user accessing the server from a given endpoint device is the same user (e.g., in a typical enterprise environment). Consistent user identity associated with a single endpoint device is more often the case with the increasing popularity of mobile computing devices (e.g., laptop computers, tablet computers, and smartphones) in an increasingly bring-your-own-device (or "BYOD") enterprise environments. For instance, a given employee of the enterprise may bring the same (e.g., company-issued) laptop to work every business day. In some scenarios, a finite, defined set of users may share a single endpoint device at an enterprise site. As an example, in the scenario of the enterprise site being a call center, two or three users may each use a desktop computer during different designated shifts.

Techniques of this disclosure are directed to leveraging the increasingly consistent user identity associated with a single client device to improve the performance of network environment 10. In other words, NAC device 14 may be configured to concurrently implement two or more steps of an LDAP authentication workflow, in accordance with one or more aspects of this disclosure. More specifically, in accordance with the techniques described herein, NAC device 14 implements multiple LDAP authentication steps in parallel, instead of requiring that steps to be implemented serially (e.g., individually and sequentially, or "in series"). In this manner, NAC device 14 potentially reduces the time expended to perform LDAP authentication, and may also mitigate the usage of computing resources and network bandwidth for LDAP authentication.

NAC device 14 may implement techniques of this disclosure to maintain historical login data, such as a device-to-user mapping for various endpoint devices with which NAC device 14 has previously established communication sessions. For instance, at the time of a first login attempt received from client device 12 NAC device 14 may store a mapping of a device identifier for client device 12 to a user identity. At subsequent login requests received from client device 12, NAC device 14 may use the historical login information to predict a user assumed to be making the request. Based on the prediction and prior to completing a user authentication process, NAC device 14 sends message 21 (e.g., in the form of an LDAP BIND request) to pre-fetch attributes 25 from LDAP server 16, in parallel with authenticating client device 12 with authentication server 24. For example, NAC device can send message 21 to LDAP server 16 requesting user attributes for the predicted user prior to receiving an authentication response message 27 from authentication server 24. NAC device 14 then receives a response message 25 from LDAP server 16 with the requested user attributes. At some point, NAC device 14 also receives a response message 27 from authentication server 24 (e.g., a RADIUS message) indicating whether authentication of the user was successful. In this manner, NAC device 14 implements the techniques of this disclosure to fetch user attributes for a predicted user from LDAP server 16, in parallel with one or more steps required for user authentication. If NAC device 14 correctly predicted the user making the request, then NAC device 14 can use the pre-fetched user attributes when provisioning the communication session with enterprise network 20.

In some examples, according to the techniques described herein, NAC device 14 may perform the first login of client device 12 according to the following workflow:
1. NAC device 14 connects with client device 12 (e.g., in response to a connection request received from client device 12).
2. NAC device 14 prompts client device 12 for user credentials.
3. Client device 12 prompts a user to enter the user's credentials.
4. Client device 12 receives the entered user credentials, and sends the user credentials to NAC device 14.
5. NAC device 14 authenticates the user credentials against an authentication server 24 (e.g., according to a RADIUS protocol).
6. NAC device 14 fetches attributes 25 from LDAP server 16 (e.g., by sending attribute request 21 to LDAP serve 16).
7. NAC device 14 creates a communication session with client device 12, and stores a unique device ID for client device 12.
8. Client device 12 stores the device ID for use in subsequent logins via NAC device 14.

Examples of device IDs that NAC device 14 may store for client device 12 include a media access control (MAC) address, a device name, an international mobile station equipment identity (IMEI) number, a universal device identifier (UDID) in case of client device 12 including certain smartphones, and an internet protocol (IP) address, such as a dynamic host configuration protocol (DHCP) IP address, associated with client device 12. In some examples, a device ID may be an IP version six (IPv6) address associated with client device 12, for example. In some implementations, NAC device 14 is configured to store a login time associated with one or more past login attempts, as different users may log in from the same client device 12 at different times of day, such as in the case of enterprise network 20 belonging to a call center, where different users may use client device 12 during respective shifts. NAC device 14 stores data associating an identifier of client device 12 with a user identity associated with the received user credentials. In examples where NAC device 14 also stores login time data, NAC device 14 may map the device ID to multiple user identities, and optionally map each user identity to a login time (or time slice). In some examples, NAC device 14 can alternatively or additionally store location data indicating a location of client device 12 at the time of a login attempt. In this manner, NAC device 14 may implement the techniques described herein to store historical data that includes one-to-one or many-to-one data mappings, as well various types of multi-dimensional data mappings.

Additionally, NAC device 14 may, in some examples, communicate the unique device ID to client device 12, so that client device 12 may provide the device ID in subsequent login attempts to aid in parallelization and attribute pre-fetching. In this manner, NAC device 14 implements techniques of this disclosure to correlate user identities to client device 12, while also enabling client device 12 to synchronize device identification data with NAC device 14.

Subsequent to processing the first login attempt of client device 12 as described above, NAC device 14 processes subsequent login attempts from client device 12 according to the following example workflow:
1. NAC device 14 connects with client device 12, and obtains the device ID assigned to client device 12.
2. NAC device 14 performs the following steps:
  a) Prompts client device 12 to provide user credentials for the current login attempt.
  b) Based on the historical data (e.g., device-to-user mapping(s)) associated with client device 12, NAC device 14 pre-fetches attributes associated with the predicted user from LDAP server 16, concurrently with one or more other steps of this workflow. More specifically, NAC device 14 pre-fetches attributes that correspond to the user identity or identities that were previously associated with the particular device ID received from client device 12.
3. Client device 12 prompts the current user to enter user credentials to log in to enterprise network 20.
4. Client device 12 receives the user credentials, and sends the user credentials to NAC device 14. If the actual user credentials are for a user other than the predicted user, NAC device 14 stops/aborts the attribute pre-fetch, and, if applicable, may discard, any pre-fetched attributes.
5. NAC device 14 authenticates the user credentials such as by exchanging messages with an authentication server (e.g., RADIUS).
6. If the actual user credentials are for a user other than the predicted user (e.g., a user that is associated with client device 12 in the device-to-user mapping), NAC device 14 fetches attributes 25 from LDAP server 16 again, this time fetching attributes 25 associated with the newly-indicated user identity.
7. NAC device 14 provisions a communication session with client device 12 by and uses the user attribute information fetched from LDAP server 16.
8. NAC device 14 stores historical user login data (e.g., by creating the mapping between client device 12 and one or more of the newly-received user credentials and/or other data associated with the login).

As illustrated by the example workflows described above, NAC device 14 may implement the techniques of this disclosure to use historical login data (or login heuristics) from previous login attempts received from client device 12. In turn, if NAC device 14 matches the device ID of client device 12 to one or more previously-mapped user identities, NAC device 14 implements the techniques to pre-fetch corresponding attributes 25, in parallel with other LDAP authentication steps. On the other hand, if NAC device 14 does not have access to any previous user identity associated with login attempts from client device 12, NAC device 14 can perform the steps of authentication and LDAP attribute fetching serially. In this manner, NAC device 14 may implement the techniques of this disclosure to conserve time and computing resources by using parallel LDAP authentication steps in scenarios where login heuristics are available, while maintaining robust login integrity by implementing serial LDAP authentication steps in cases where such login heuristics are not readily available to NAC device 14.

Figure 2:
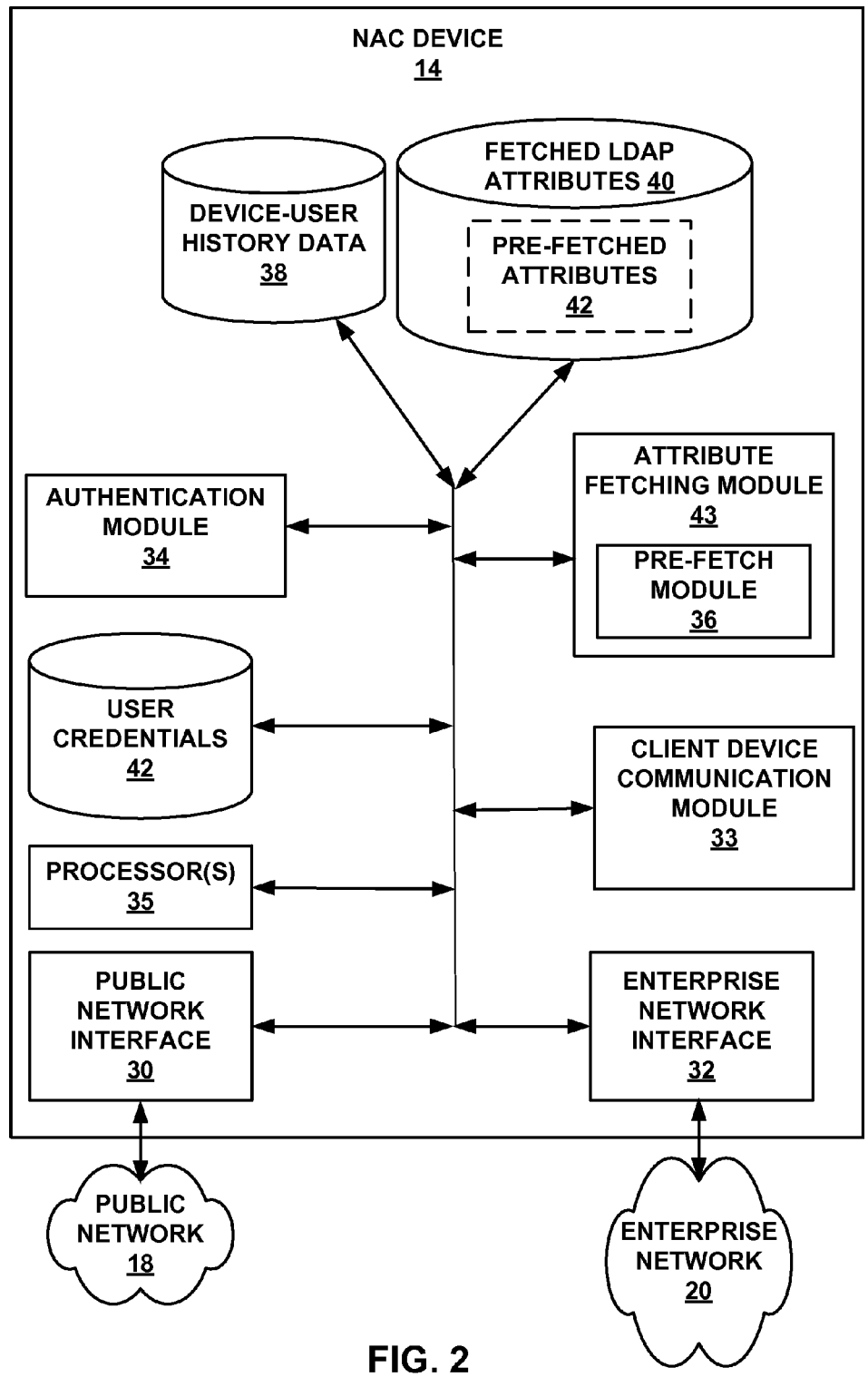
FIG. 2 is a block diagram illustrating further details of a NAC device in accordance with one or more aspects of this disclosure.

FIG. 2 is a block diagram illustrating further details of an example implementation of NAC device 14 configured in accordance with one or more aspects of this disclosure. Although FIG. 2 illustrates a NAC device for purposes of example, it will be understood that the techniques described herein are not limited to a network access control device and may be performed by a variety of devices, such as an SSL VPN device, or any other device configured to provide authentication and authorization functionality, and/or to fetch user attributes from a backend LDAP server. According to the example implementation illustrated in FIG. 2, NAC device 14 includes public network interface 30, enterprise network interface 32, an authentication module 34, one or more processors 35, a database containing device-user history data 38, and a database for fetched LDAP attributes 40. Authentication module 34 includes attribute fetching module 43, pre-fetch module 36, and fetched LDAP attributes 40 which can optionally include pre-fetched attributes 42. NAC device 14 communicates over public network 18 via public network interface 30, and communicates over enterprise network 20 via second network interface 32. For instance, NAC device 14 communicates with endpoint devices, including client device 12, using public network interface 30, and communicates with enterprise resource 26 using enterprise network interface 32.

Processor(s) 35, in one example, are configured to implement functionality and/or process instructions for execution within NAC device 14. Examples of processor(s) 32 include any one or more of a microprocessor, a controller, a digital signal processor (DSP), an application specific integrated circuit (ASIC), a field programmable gate array (FPGA), or equivalent discrete or integrated logic circuitry.

Client device communication module 33 may populate device-user history data 38 with historical device usage history of various endpoint devices, such as client device 12. For instance, client device communication module 33 stores, to device-user history data 38, information on user identities (e.g., as extracted from usernames of received user credentials). In various examples, client device communication module 33 stores mappings of device IDs to user identities to form the device usage history of device-user history data 38. In some examples, device-user history data 38 includes one or more of a device identifier, location identifier, or current time for each respective access request received from each of a plurality of client devices.

In an example where client device 12 attempts to gain access to enterprise network 20, public network interface 30 receives a connection request from client device 12. In turn, public network interface 30 forwards the received connection request to client device communication module 33. Based on the received connection request, client device communication module 33 (via public network interface 30) prompts client device 12 to provide user credentials to login to enterprise network 20. In some examples, the received connection request may be a hypertext transfer protocol secure (HTTPS) compliant message. In some examples, the connection request may include an IF-T transport layer secured (TLS) protocol-compliant message. IF-T is a transport layer protocol for carrying messages, such as from endpoint devices, over a network.

Authentication module 34 may communicate with an authentication server using one or more network protocols, such as the remote authentication dial in user server (RADIUS) protocol. More specifically, authentication module 34 is configured to request an authentication device such as a RADIUS server to compare received user credentials against trusted credentials, to determine whether or not to grant endpoint devices access to enterprise network 20.

Upon receiving a connection request sent from client device 12, authentication module 34 prompts client device 12 for user credentials, in order to determine whether to permit client device 12 access to enterprise network 20. Additionally, in accordance with the techniques described herein, pre-fetch module 36 may obtain the device ID associated with client device 12 from the received connection request. In turn, pre-fetch module 36 checks device-user history data 38 to determine whether device-user history data 38 contains an entry for the device ID, indicating that authentication module 34 has processed login requests from client device 12 in the past. More specifically, if authentication module 34 has processed login requests from client device 12 in the past, then, pre-fetch module 36 may predict a user identity assumed to be making the current request for network access based on data associated with the past login attempts received from client device 12. In some examples, pre-fetch module 36 may select a predicted user based at least in part on the device ID and a time of day of the current request, in comparison with times of day in device-user history data 38.

In cases where pre-fetch module 36 successfully locates one or more user identities associated with client device 12 in device-user history data 38, pre-fetch module 36 obtains (or "pre-fetches") attributes associated with the user identity from LDAP server 16, concurrently with authentication module 34 receiving or waiting to receive user credentials from client device 12. In other words, if NAC device 14 has login heuristics locally stored for client device 12, then pre-fetch module 36 "predictively" retrieves LDAP attributes for the user identity associated with client device 12 in device-user history data 38, without waiting to first receive the user credentials from client device 12. In this manner, pre-fetch module 36 parallelizes the fetching of LDAP attributes, with other steps of LDAP-based authentication, thereby reducing session-configuration times and potentially conserving computing resources and network bandwidth in comparison to a purely sequential approach.

In turn, upon receiving the pre-fetch attributes from LDAP server 16, pre-fetch module 36 stores the pre-fetched data to pre-fetched attributes 42. Pre-fetched attributes 42 are illustrated as being included in a database of fetched LDAP attributes 40. In general, fetched LDAP attributes 40 include any LDAP attributes that client device communication module 33 module 34 fetches from LDAP server 16, whether serially or in parallel with other authentication steps. Additionally pre-fetched attributes 42 are illustrated in FIG. 2 with dashed-line borders to indicate that fetched LDAP attributes 40 may or may not, under various circumstances, include attributes that pre-fetch module predictively fetches based on device-user history data 38.

If authentication module 34 receives an indication that authentication server 24 matches the received user credentials to a set of trusted credentials 22, then client device communication module 33 provisions a communication session with client device 12, and grants client device 12 access to enterprise network 20. More specifically, client device communication module 33 provisions the session in accordance with parameters specified in pre-fetched attributes 42. On the other hand, if authentication module 34 fails to match the received user credentials to any set of trusted credentials 22, then pre-fetch module 36 may discard pre-fetched attributes 42, or may to stop the predictive pre-fetch process, depending on the current stage of completion of the predictive pre-fetch process.

On the other hand, if pre-fetch module 36 does not find any past login history associated with the device ID of client device 12 in device-user history data 38, NAC device 14 processes the login attempt of client device 12 by performing LDAP authentication steps in serial. For instance, authentication module 34 waits to receive the user credentials from client device 12, after prompting client device 12 to provide the credentials. In turn, after receiving the user credentials, attribute fetching module 43 communicates with LDAP server 16 via public network interface 30, to obtain fetched LDAP attributes 40. In this manner, NAC device 14 implements techniques of this disclosure to predictively pre-fetch LDAP attributes to conserve time and resources when device-user history data 38 includes data for past logins of client device 12, while maintaining a robust LDAP authentication and session-configuration procedure for situations where the device-user history data 38 does not include past login information for client device 12.

Figure 3:
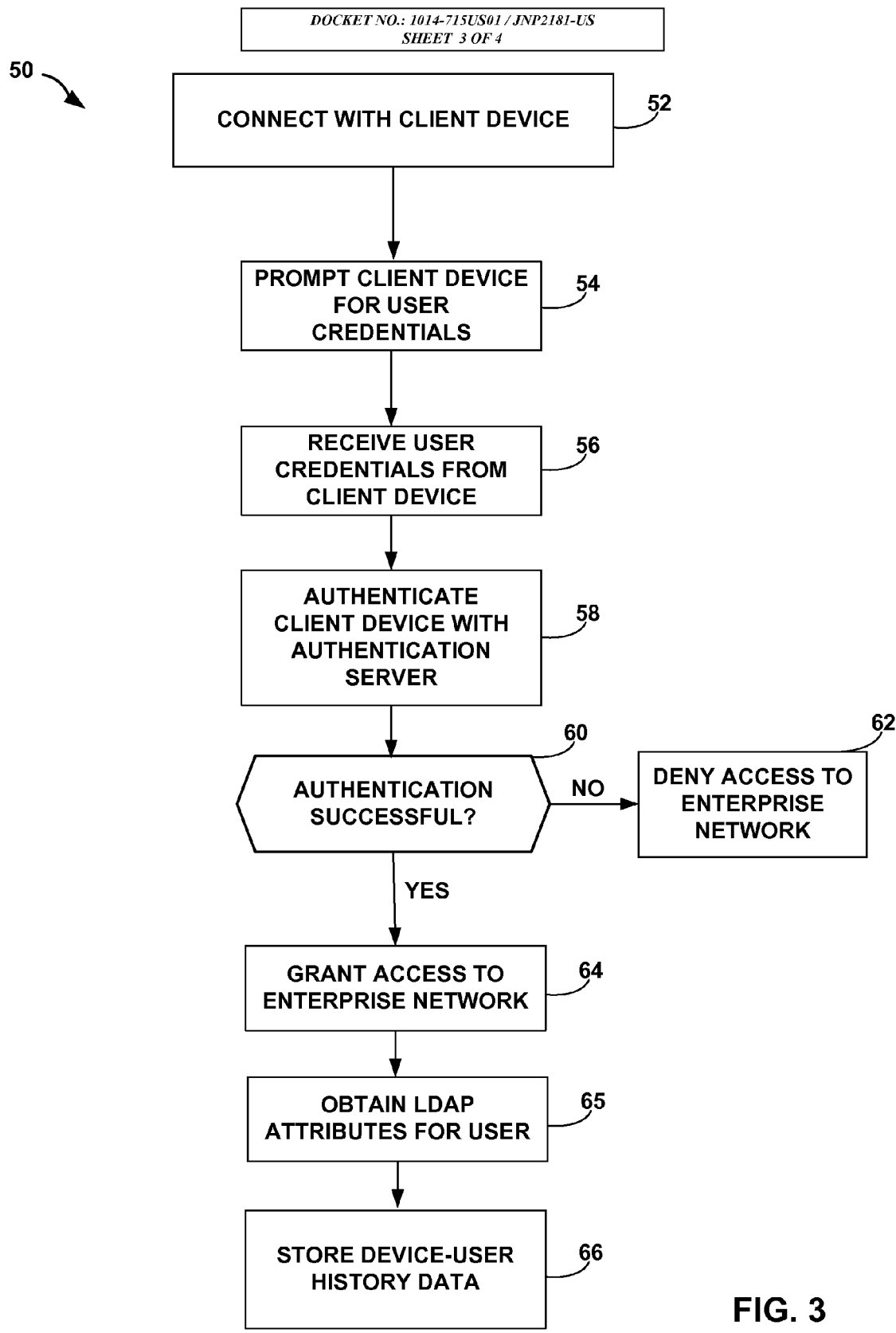
FIG. 3 is a flowchart illustrating an example process that a NAC device is configured to perform in accordance with one or more aspects of this disclosure.

FIG. 3 is a flowchart illustrating an example process 50 that NAC device 14 is configured to perform in accordance with one or more aspects of this disclosure. More specifically, NAC device 14 is configured to perform process 50 during a first login attempt received from client device 12. For example, NAC device 14 performs process 50 in a scenario where device-user history data 38 does not include any login heuristics with respect to the device ID associated with client device 12.

Process 50 begins when NAC device 14 connects with client device 12 (52). For instance, NAC device 14 may connect with client device 12 based on receiving a connection request from client device 12, via public network interface 30. Upon NAC device 14 connecting with client device 12, authentication module 34 prompts client device 12 for user credentials (54). More specifically, authentication module 34 prompts client device 12 for user credentials in order to determine whether the current user of client device 12 is a trusted user, in terms of accessing enterprise network 20.

In turn, authentication module 34 receives the user credentials from client device 12 (56). As an example, client device 12 may receive the prompt sent by authentication module 34, and in response, prompt the current user to enter user credentials to a user interface of client device 12 for access to enterprise network 20. In turn, client device 12 sends the user credentials provided by the current user over public network 10, to NAC device 14. Upon receiving the user credentials from client device 12, authentication module 34 checks trusted credentials 22 stored at authentication server 24 (58). For example, authentication module 34 may send a message in accordance with the RADIUS protocol to authentication server 24 with the user credentials, and authentication server 24 in turn accesses trusted credentials 22 to locate a matching set of trusted credentials against which to compare the received user credentials.

The authentication server 24 can determine whether a matching credential set is included in trusted credentials 22, and based on the determination can send a message to authentication module 34 of NAC device 14 indicating whether the authentication was successful (60). For instance, authentication server 24 may iterate through trusted credentials 22 until authentication server 24 locates a credential set with a username/password tuple that matches the username/password tuple received from client device 12. If authentication server 24 determines that trusted credentials 22 do not include a credential set corresponding to the received user credentials, then authentication server 34 sends a message to NAC device 14 indicating that the user is not authenticated (NO branch of 60), and in turn authentication module 34 may deny client device 12 access to enterprise network 20 (62).

if authentication server 24 determines that trusted credentials 22 include a credential set corresponding to the received user credentials, then authentication server 34 sends a message to NAC device 14 indicating that the user is authenticated (YES branch of 60), and in turn authentication module 34 grants client device 12 access to enterprise network 20 (64). After the user is authenticated, attribute fetching module 43 fetches user attributes from a directory server (65), such as LDAP server 16. For example, attribute fetching module 43 can send a message in accordance with LDAP to LDAP server 16 requesting user attributes for a user identifier of the user, and can receive a response from LDAP server 16 providing the requested user attributes. Client device communication module 33 may provision a communication session with client device 12 to access enterprise network and can use the fetched LDAP attributes 40. For example, the NAC device 14 may issue one or more policies to one or more enforcement devices that allow the authenticated user to access one or more sets of protected resources on enterprise network 20, such as enterprise resource 26.

Examples of fetched LDAP attributes 40 include group identification (ID) information, password change information, login times, web browser home page, a common name, a department, a department number, an employee number, an employee type, an organization and/or organizational unit, unique user ID, a home directory, a home drive, a unique user ID in situations where an active directory (AD) is accessed by an LDAP server, and others.

Additionally, in accordance with the techniques of this disclosure client device communication module 33 stores an association between the device ID of client device 12 and the user identity of the current user to device-user history data 38 (68). For instance, client device communication module 33 maps the device ID of client device 12 to the username or other user identifier included in the user credentials received from client device 12. In some examples, authentication module 34 stores the mapping information to device-user history data 38. In this manner, NAC device 14 and its components implement the techniques described herein to store historical device-user mapping data for future use. In some examples, client device communication module 33 can send the device ID to client device 12 via public network interface 30, to enable client device 12 to provide the device ID with subsequent login attempts, to aid pre-fetch module 36 in predictive pre-fetching of LDAP attributes.

Figure 4:
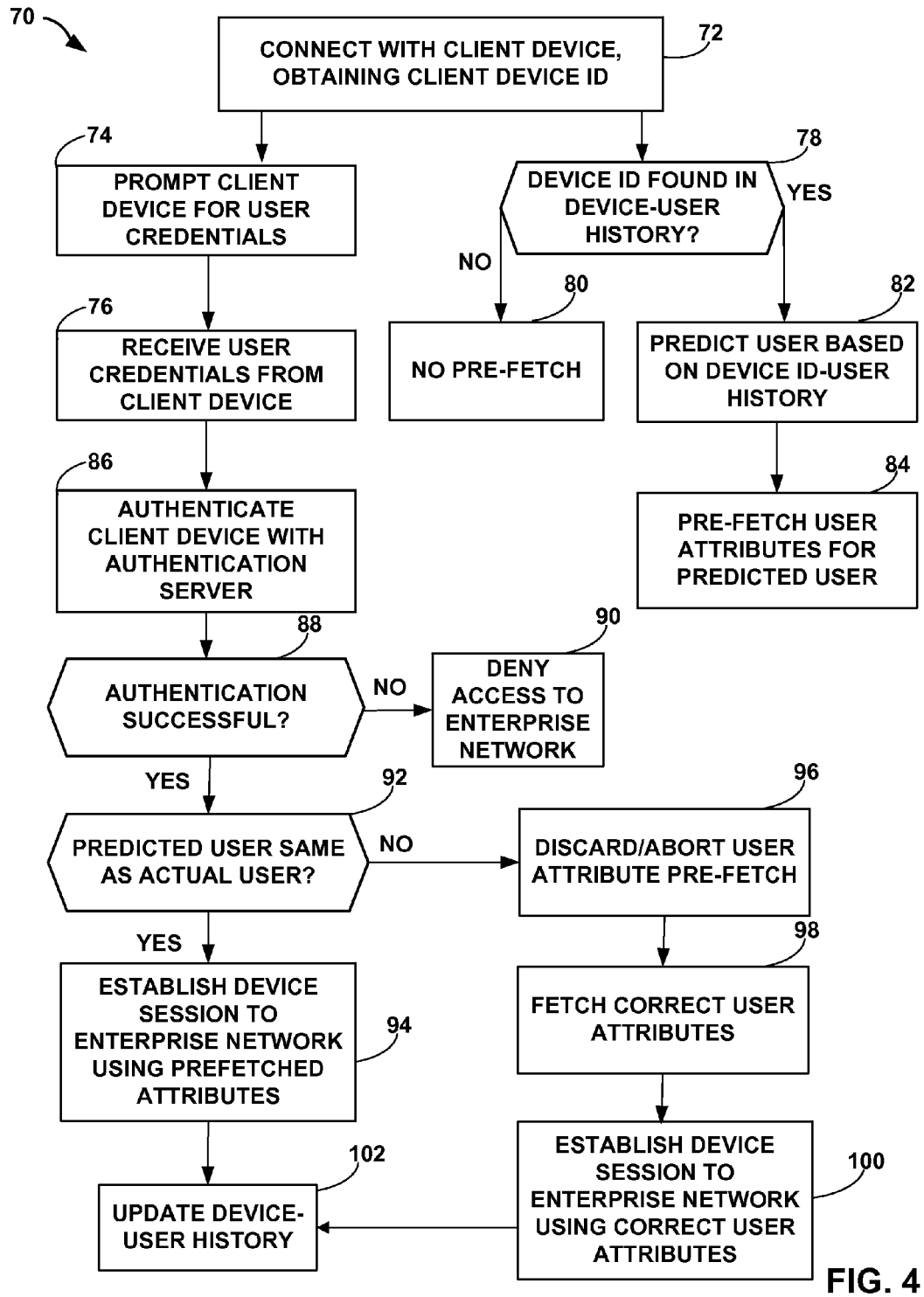
FIG. 4 is a flowchart illustrating an example process that a NAC device is configured to perform in accordance with one or more aspects of this disclosure.

FIG. 4 is a flowchart illustrating an example process 70 that NAC device 14 is configured to perform in accordance with one or more aspects of this disclosure. In some examples, process 70 may occur during a second or subsequent login attempt of client device 12, after storing login history for client device 12 to device-user history data 38, although this need not be the case. Process 70 begins when NAC device 14 connects with client device 12, while obtaining the device ID assigned to client device 12 (72). For instance, NAC device 14 may receive a connection request from client device 12, and extract the device ID from a portion (e.g., packet header) of the received connection request. An example of a protocol to which the connection request conforms is https/IFT-TLS.

In turn, authentication module 34 prompts client device 12 to provide user credentials for the login attempt (74). Based on the prompt, authentication module 34 may receive user credentials at public network interface 30, as relayed by client device 12 (76). Concurrently, or at least prior to completion of a user authentication process, pre-fetch module 36 determines whether device-user history data 38 includes login history (e.g., with one or more specific user identities) for the device ID of client device 12 (78). If pre-fetch module 36 determines that device-user history data 38 does not include any mapping data for the device ID of client device 12 (NO branch of 78), then authentication does not pre-fetch LDAP attributes with which to configure a communication session with client device 12 (8).

On the other hand, if pre-fetch module 36 determines that device-user history data 38 does include login history information for client device 12 (YES branch of 78), then pre-fetch module 36 predicts a user identity associated with the login request received from client device 12 (82) (e.g., based on heuristics). In an example where device-user history data 38 includes a mapping of client device 12 to only one user identity, pre-fetch module 36 predicts the user to be associated with the single user identity mapped to client device 12 in device-user history data 38. For example, in some cases NAC device 14 may store only the last logged-in user identity to device-user history data 38.

In an example where device-user history data 38 includes mappings of client device 12 to multiple user identities, pre-fetch module 36 may in some examples predict the user identity to be the most recent user who attempted to login from client device 12. By pre-fetching the attributes for the user identity of the most recent login attempt, pre-fetch module 36 may more quickly remediate a situation in which client device 12 is briefly disconnected and reconnected from the provisioned communication session (e.g., as may be caused by connectivity issues). In another example where device-user history data 38 includes mappings of client device 12 to multiple user identities, pre-fetch module 36 predicts the user identity to be the same a user that attempted to login during the same time of day (e.g., in a same window or slice of time) as the time of day when the current login request was received from client device 12, based on device-user history data 38. Additionally, pre-fetch module 36 predictively retrieves corresponding attributes for the predicted user and stores the retrieved data to pre-fetched attributes 42 (84).

In parallel with performing the pre-fetching steps described above, authentication module 34 authenticates user credentials received from client device 12 against trusted attributes 22 stored at authentication server 24 (86). Based on comparison response from authentication server 24, authentication module 34 determines whether the authentication attempt was successful (88). If authentication module 34 determines that the authentication attempt was not successful (NO branch of 88), client device communication module 33 denies client device 12 access to enterprise network 20 (90). Client device communication module 33 also determines whether the predicted user identity matches the actual user according to the user credentials (92). Although shown in FIG. 4 as occurring after authentication is confirmed, in some examples step 92 may occur prior to completing authentication, such as after receiving the user credentials.

If client device communication module 33 determines that the predicted user matches the actual user (YES branch of 92), then client device communication module 33 establishes a communication session with client device 12 using pre-fetched attributes 42 (94). However, if client device communication module 33 determines that the predicted user does not match the actual user (NO branch of 92), then pre-fetch module 36 may discard pre-fetched attributes 42 (e.g., by deletion) and/or aborts the current pre-fetch process, as the case may be (96). In turn, attribute fetching module 43 may fetch the correct fetched LDAP attributes 40 from LDAP server 16, based on the new user identity associated with client device 12 (98). Additionally, client device communication module 33 establishes a communication session with client device 12 using fetched LDAP attributes 40 (100). Based on the correct attributes being stored to fetched LDAP attributes 40, pre-fetch module 36 may update device-user history 38 to map client device 12 to the user identity of the most recent login attempt (102).

In this manner, processes 50 and 70 describe a method including receiving, by a network access control (NAC) device and from a client device, a request for access to a network, wherein the request includes a device identifier for the client device, predicting, by the NAC device and based on the device identifier and a device usage history of the client device, a user associated with the client device, prior to completing a user authentication process, requesting, by the NAC device and from a directory server, session attributes for the predicted user, receiving, by the NAC device and from an authentication server, an indication of whether a user associated with the client device was successfully authenticated, determining, by the NAC device and based on an identifier of the user, whether the predicted user is the user associated with the client device, and responsive to determining that the predicted user is the user associated with the client device, establishing, by the NAC and using the session attributes for the predicted user, a session between the client device and the network. In some examples, the method further includes, responsive to determining that the predicted user is different from the user associated with the client device: retrieving, by the NAC device, session attributes for the user associated with the client device, and establishing, by the NAC and using the session attributes for the user associated with the client device, the session between the client device and the network.

In one example, the method further includes, responsive to determining that the predicted user is different from the user associated with the client device: updating, by the NAC device and based on the device identifier, the device usage history to include at least one of an indication of a location of the client device or an indication of a time at which the NAC device received, from the client device, the request to access the network. In one example, the method further includes, responsive to determining that the predicted user is different from the user associated with the client device: discarding, by the NAC device, the session attributes for the predicted user.

In one example, the method further includes, prior to predicting the user associated with the client device: determining, by the NAC device, based on the device identifier and the device usage history, that the NAC has not previously received a request for access to the network from the client device, sending, by the NAC device and to the authentication server, an authentication request that includes credentials for the user associated with the client device, responsive to receiving, by the NAC device and from the authentication server, an authentication response indicating that the user was successfully authenticated: receiving, by the NAC device and from the directory server, the session attributes for the user, and establishing, by the NAC and using the session attributes for the user, the session between the client device and the network. In one example, the method further includes, responsive to receiving, by the NAC device and from the authentication server, an authentication response indicating that the user was successfully authenticated: updating, by the NAC device, the device usage history to include a mapping of the device identifier for the client device to at least the identifier of the user.

In some examples, the device usage history includes a mapping of respective device identifiers for the plurality of client devices to corresponding user identities. In one example, the method further includes receiving, by the NAC device, authentication credentials for the user associated with the client device, wherein the authentication credentials includes the identifier for the user associated with the client device. In some examples, the indication of whether the user associated with the client device was successfully authenticated includes the identifier of the user associated with the client device.

In one example, the device usage history includes one or more of a device identifier, location identifier, or current time for each respective access request received from each of the plurality of client devices. In one example, the request for access to the network includes a location of the client device, and predicting, by the NAC device and based on the device identifier and a device usage history for a plurality of client devices, a user associated with the client device includes: determining a time at which the NAC device received the request for access to the network; and receiving, by the NAC device, from the device usage history, and based on the device identifier, the location, and the time, a user identifier for the predicted user, and wherein receiving, by the NAC device and from a directory server, session attributes for the predicted user includes receiving, by the NAC, from the directory server, and based on the user identifier for the predicted user, the session attributes for the predicted user.

Additionally, NAC device 14 is an example of a network access control device including one or more processors, one or more network interfaces that receive, from a client device, a request for access to a network, wherein the request includes a device identifier for the client device, a pre-fetch module operable by the one or more processors to predict, based on the device identifier and a device usage history of the client device, a user associated with the client device, prior to completing a user authentication process, request, from a directory server, session attributes for the predicted user, an authentication module operable by the one or more processors to receive, from an authentication server, an indication of whether a user associated with the client device was successfully authenticated and determine, based on an identifier of the user, whether the predicted user is the user associated with the client device, and a client device communication module operable by the one or more processors to, responsive to determining that the predicted user is the user associated with the client device, establish, using the session attributes for the predicted user, a session between the client device and the network.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may comprise one or more computer-readable storage media.

In some examples, computer-readable storage media may comprise a tangible or non-transitory media, such as one or more computer-readable storage devices. The term "non-transitory" may indicate that the storage medium is not embodied in a carrier wave or a propagated signal. In certain examples, a non-transitory storage medium or non-transitory computer-readable storage device may store data that can, over time, change (for example, in RAM or cache).

Various examples have been described. These and other examples are within the scope of the following claims.

What is claimed is:

1. A method comprising:
receiving, by a network access control (NAC) device and from a client device, a request for access to a network, wherein the request includes a device identifier for the client device;
predicting, by the NAC device and based on the device identifier and a device usage history of the client device, a user assumed to be making the request;
prior to completing a user authentication process, requesting, by the NAC device and from a directory server, session attributes for the predicted user;
receiving, by the NAC device and from an authentication server, an indication of whether a user associated with the client device was successfully authenticated;

determining, by the NAC device and based on an identifier of the user, whether the predicted user is the user associated with the client device; and responsive to determining that the predicted user is the user associated with the client device, establishing, by the NAC and using the session attributes for the predicted user, a session between the client device and the network.

2. The method of claim 1, further comprising, responsive to determining that the predicted user is different from the user associated with the client device:

retrieving, by the NAC device, session attributes for the user associated with the client device; and establishing, by the NAC and using the session attributes for the user associated with the client device, the session between the client device and the network.

3. The method of claim 2, further comprising, responsive to determining that the predicted user is different from the user associated with the client device:

updating, by the NAC device and based on the device identifier, the device usage history to include at least one of an indication of a location of the client device or an indication of a time at which the NAC device received, from the client device, the request for access to the network.

4. The method of claim 2, further comprising, responsive to determining that the predicted user is different from the user associated with the client device:

discarding, by the NAC device, the session attributes for the predicted user.

5. The method of claim 1, further comprising, prior to predicting the user associated with the client device:

determining, by the NAC device, based on the device identifier and the device usage history, that the NAC has not previously received a request for access to the network from the client device;

sending, by the NAC device and to the authentication server, an authentication request that includes credentials for the user associated with the client device;

responsive to receiving, by the NAC device and from the authentication server, an authentication response indicating that the user was successfully authenticated:

receiving, by the NAC device and from the directory server, the session attributes for the user; and establishing, by the NAC and using the session attributes for the user, the session between the client device and the network.

6. The method of claim 5, further comprising, responsive to receiving, by the NAC device and from the authentication server, an authentication response indicating that the user was successfully authenticated:

updating, by the NAC device, the device usage history to include a mapping of the device identifier for the client device to at least the identifier of the user.

7. The method of claim 1, wherein the device usage history comprises a mapping of respective device identifiers for the plurality of client devices to corresponding user identities.

8. The method of claim 1, further comprising:

receiving, by the NAC device, authentication credentials for the user associated with the client device, wherein the authentication credentials includes the identifier for the user associated with the client device.

9. The method of claim 1, wherein the indication of whether the user associated with the client device was successfully authenticated includes the identifier of the user associated with the client device.

10. The method of claim 1, wherein the device usage history includes one or more of a device identifier, location identifier, or current time for each respective access request received from each of the plurality of client devices.

11. The method of claim 1, wherein the request for access to the network includes a location of the client device, wherein predicting, by the NAC device and based on the device identifier and a device usage history for a plurality of client devices, a user associated with the client device comprises:

determining a time at which the NAC device received the request for access to the network; and receiving, by the NAC device, from the device usage history, and based on the device identifier, the location, and the time, a user identifier for the predicted user, and wherein receiving, by the NAC device and from a directory server, session attributes for the predicted user comprises receiving, by the NAC, from the directory server, and based on the user identifier for the predicted user, the session attributes for the predicted user.

12. A network access control device comprising:

one or more processors;

one or more network interfaces that receive, from a client device, a request for access to a network, wherein the request includes a device identifier for the client device;

a pre-fetch module operable by the one or more processors to predict, based on the device identifier and a device usage history of the client device, a user assumed to be making the request, and to, prior to completing a user authentication process, request, from a directory server, session attributes for the predicted user;

an authentication module operable by the one or more processors to receive, from an authentication server, an indication of whether a user associated with the client device was successfully authenticated and determine, based on an identifier of the user, whether the predicted user is the user associated with the client device; and a client device communication module operable by the one or more processors to, responsive to determining that the predicted user is the user associated with the client device, establish, using the session attributes for the predicted user, a session between the client device and the network.

13. The network access control device of claim 12, wherein, responsive to the authentication module determining that the predicted user is different from the user associated with the client device, the client device communication module is operable by the one or more processors to retrieve session attributes for the user associated with the client device, and establish, using the session attributes for the user associated with the client device, the session between the client device and the network.

14. The network access control device of claim 13, wherein, responsive to the authentication module determining that the predicted user is different from the user associated with the client device, the client device communication module is operable by the one or more processors to update, based on the device identifier, the device usage history to include at least one of an indication of a location of the client device or an indication of a time at which the network access control device received, from the client device, the request to access the network.

15. The network access control device of claim 13, wherein, responsive the authentication module determining that the predicted user is different from the user associated with the client device, the client device communication module is operable by the one or more processors to update, based on the device identifier, the device usage history to include at least one of an indication of a location of the client device or an indication of a time at which the network access control device received, from the client device, the request to access the network.

16. The network access control device of claim 12,
wherein the pre-fetch module is operable by the one or more processors to determine, prior to predicting the user associated with the client device and based on the device identifier and the device usage history, that the network access control device has not previously received a request for access to the network from the client device,
wherein the authentication module is operable by the one or more processors to, prior to predicting the user associated with the client device, send, to the authentication server, an authentication request that includes credentials for the user associated with the client device, and
wherein the client device communication module is operable by the one or more processors to, prior to predicting the user associated with the client device and responsive to the authentication module receiving, from the authentication server, an authentication response indicating that the user was successfully authenticated, receive, from the directory server, the session attributes for the user, and establish, using the session attributes for the user, the session between the client device and the network.

17. The network access control device of claim 16, wherein the client device communication module is operable by the one or more processors to, responsive to the authentication module receiving, from the authentication server, an authentication response indicating that the user was successfully authenticated, update the device usage history to include a mapping of the device identifier for the client device to at least the identifier of the user.

18. The network access control device of claim 12,
wherein the request for access to the network includes a location of the client device,
wherein the client device communication module is operable by the one or more processors to determine a time at which the network access control device received the request for access to the network, retrieves, based on the device identifier, the location, and the time, a user identifier for the predicted user, and receives, from the directory server and based on the user identifier for the predicted user, the session attributes for the predicted user.

19. The network access control device of claim 12, wherein the identifier for the user associated with the client device is included in at least one of authentication credentials for the user associated received from the client device or the indication of whether the user associated with the client device was successfully authenticated.

20. A non-transitory computer-readable storage medium comprising instructions for causing one or more programmable processors of a network access control (NAC) device to:
receive, from a client device, a request for access to a network, wherein the request includes a device identifier for the client device;
predict, based on the device identifier and a device usage history of the client device, a user assumed to be making the request;
prior to completing a user authentication process, request, from a directory server, session attributes for the predicted user;
receive, from an authentication server, an indication of whether a user associated with the client device was successfully authenticated;
determine, based on an identifier of the user, whether the predicted user is the user associated with the client device; and
responsive to determining that the predicted user is the user associated with the client device, establish, using the session attributes for the predicted user, a session between the client device and the network.

\* \* \* \* \*